US010346129B1

United States Patent
Jaini et al.

(10) Patent No.: US 10,346,129 B1
(45) Date of Patent: Jul. 9, 2019

(54) GAMIFYING VOICE SEARCH EXPERIENCE FOR CHILDREN

(71) Applicant: Google Inc., Mountain View, CA (US)

(72) Inventors: Shiva Jaini, Sunnyvale, CA (US); Satoe Haile, San Francisco, CA (US); Aaron Schurman, South Lake Tahoe, CA (US)

(73) Assignee: Google LLC, Mountain View, CA (US)

( * ) Notice: Subject to any disclaimer, the term of this patent is extended or adjusted under 35 U.S.C. 154(b) by 230 days.

(21) Appl. No.: 15/176,654

(22) Filed: Jun. 8, 2016

(51) Int. Cl.
  *G06F 3/16* (2006.01)
  *G06F 3/0484* (2013.01)
  *G06F 3/0482* (2013.01)
  *G06F 16/248* (2019.01)
  *G06F 16/9535* (2019.01)

(52) U.S. Cl.
  CPC ............ *G06F 3/167* (2013.01); *G06F 3/0482* (2013.01); *G06F 3/04842* (2013.01); *G06F 16/248* (2019.01); *G06F 16/9535* (2019.01)

(58) Field of Classification Search
  CPC ................................ G06F 3/167; G06F 3/0482
  See application file for complete search history.

(56) References Cited

U.S. PATENT DOCUMENTS

| 6,714,222 | B1* | 3/2004 | Bjorn ................ G06F 3/0481 715/773 |
| 7,539,656 | B2* | 5/2009 | Fratkina ............ G06F 17/30654 706/45 |
| 2006/0143307 | A1* | 6/2006 | Codignotto .......... G06Q 10/107 709/246 |
| 2008/0232277 | A1* | 9/2008 | Foo ..................... H04L 12/1822 370/260 |
| 2014/0040748 | A1* | 2/2014 | Lemay .................. G06F 3/167 715/728 |
| 2015/0006564 | A1* | 1/2015 | Tomkins ........... G06F 17/30867 707/767 |
| 2017/0169113 | A1* | 6/2017 | Bhatnagar ........ G06F 17/30867 |

* cited by examiner

*Primary Examiner* — Amy Ng
*Assistant Examiner* — Nicole E Kim
(74) *Attorney, Agent, or Firm* — Lowenstein Sandler LLP

(57) ABSTRACT

Implementations disclose gamifying voice search experience. A method includes receiving, by a user device, a user request to perform a search associated with an audio input and upon determining that the audio input for the search has not been provided during a first predefined time interval, displaying on a graphical user interface (GUI) of the user device, one or more GUI elements representing one or more audio prompts pertaining to the search. In response to an activation of one of the GUI elements within a second predefined time interval, an audio prompt corresponding to the activated GUI element is played. The method further includes receiving an audio response to the audio prompt, the audio response indicating a query for the search, and presenting, on the user device, a search result for the indicated query, the search result including one or more media items.

23 Claims, 8 Drawing Sheets

GAMIFYING VOICE SEARCH EXPERIENCE FOR CHILDREN

TECHNICAL FIELD

This disclosure relates to the field of content searches and, in particular, to gamifying a voice search experience for children.

BACKGROUND

On the Internet, social networks allow users to connect to and share information with each other. Many social networks include a content sharing aspect that allows users to upload, view, and share content, such as video content, image content, audio content, text content, and so on (which may be collectively referred to as "media items" or "content items"). Such media items may include audio clips, movie clips, TV clips, and music videos, as well as amateur content such as video blogging, short original videos, pictures, photos, other multimedia content, etc. Users may use computing devices (such as smart phones, cellular phones, laptop computers, desktop computers, netbooks, tablet computers) to use, play, and/or consume media items (e.g., watch digital videos, and/or listen to digital music).

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the disclosure, a method includes receiving, by a processing device of a user device, a user request to perform a search associated with an audio input. The method further includes displaying on a graphical user interface (GUI) of the user device, one or more GUI elements representing one or more audio prompts pertaining to the search upon determining that the audio input for the search has not been provided during a first predefined time interval. The method further includes playing an audio prompt corresponding to the activated GUI element in response to an activation of one of the one or more GUI elements within a second predefined time interval. The method further includes receiving, by the processing device, an audio response to the audio prompt, the audio response indicating a query for the search and presenting, on the user device, a search result for the indicated query, the search result comprising one or more media items.

In some implementations, the method also includes: in response to the activation, displaying a visual prompt corresponding to the activated GUI element, in addition to the playing of the audio prompt. In some implementations, the one or more audio prompts are based on an age of a user of the user device. In some implementations, the one or more audio prompts are based on a location of the user device. In some implementations, the one or more audio prompts are based on the search history of a user of the user device. In some implementations, the one or more audio prompts are based on a calendar time of the search. In some implementations, the one of the one or more GUI elements is activated when a user selects the GUI element.

In some implementations, the method also includes: automatically playing the audio prompt corresponding to the activated GUI element responsive to detecting that a user has not activated any of the one or more GUI elements within the second predefined time interval. In some implementations, the method also includes: after playing the audio prompt, allowing the user to provide the audio response within a third time interval without any manual interaction with the GUI. In some implementations, each media item of the one or more media items comprised by the search result has a rating that indicates appropriateness of a respective media item for children.

In another aspect of the disclosure, a method includes receiving, from a user device, an indication that an audio input for a search has not been received during a predefined time interval. The method further includes determining, by a processing device, one or more search prompts specific to a user of the user device. The method further includes: providing the one or more search prompts specific to the user for presentation to the user of the user device and receiving, from the user device, an answer to one of the one or more search prompts. The method further includes: searching, by the processing device, for one or more media items based on the answer to the one of the one or more search prompts.

In some implementations, determining the one or more search prompts includes: receiving an age of a user of the user device; and determining the one or more search prompts based on the age. In some implementations, determining the one or more search prompts includes: determining at least one of: a location of the user device, a search history of a user of the user device, or a calendar time of the search; and determining the one or more search prompts based on the location, the search history, or the calendar time of the search. In some implementations, each media item of the one or more media items has a rating that indicates appropriateness of a respective media item for children.

Computing devices for performing the operations of the above described methods and the various implementations described herein are disclosed. Computer-readable media that store instructions for performing operations associated with the above described methods and the various implementations described herein are also disclosed.

BRIEF DESCRIPTION OF THE DRAWINGS

The present disclosure is illustrated by way of example, and not by way of limitation, in the figures of the accompanying drawings.

DETAILED DESCRIPTION

Figure 1:
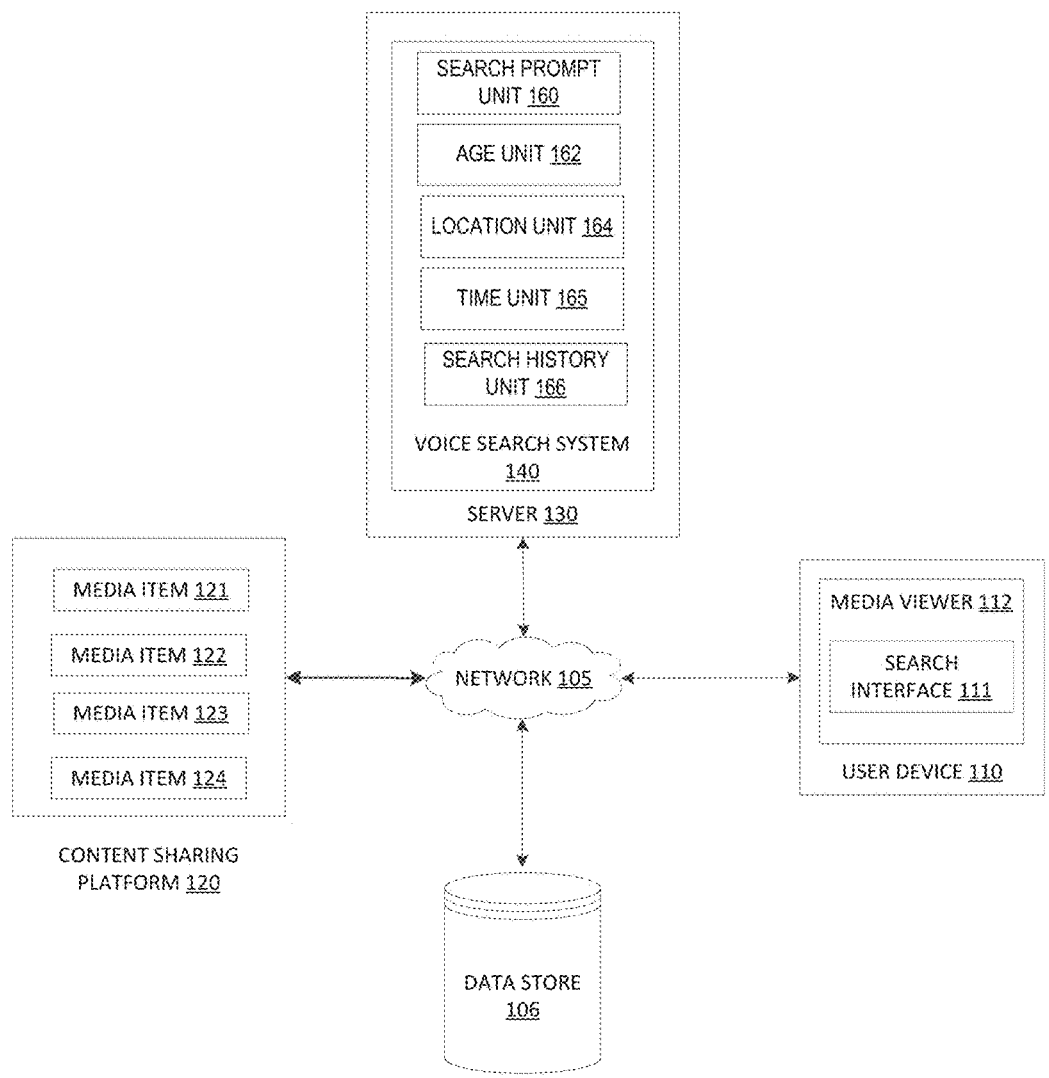
FIG. 1 is a block diagram illustrating an exemplary network architecture in which implementations of the present disclosure may be implemented.

Aspects of the disclosure are directed to gamifying a voice search experience for children. In particular, implementations are described for providing a user interface that assists children with content searches using a game-like approach.

Existing search solutions rely on textual prompts to assist a user to search for relevant content. Such textual prompts do not aid young children, who may not yet know how to read, with finding appropriate content. Voice search may be better suited for young children. However, voice search can be ineffective for children who are new to voice search and do not know what to ask for when they try to access or use voice search features. In addition, children often pause when prompted to speak, and sometimes get nervous and stutter, which leads to inaccurate voice recognition and therefore inaccurate search results.

Aspects of the present disclosure transform content searching into a game-like experience that teaches young users how to search for interesting content. In particular, aspects of the present disclosure provide a graphical user interface (GUI) that includes a voice search indicator visually illustrating a voice search option. When a user selects the voice search indicator in the GUI presented on the screen of the user device, one or more search prompt indicators can appear in the GUI. These search prompt indicators can be presented, for example, as bubbles floating around the screen of the user device. The bubbles may be shown with a visual search indicator (e.g., a question mark) to demonstrate that they pertain to search queries.

If the user selects one of the bubbles (e.g., by clicking on it), a corresponding audio search prompt can be played for the user. A search prompt can be a hint question that identifies a topic for a search. For example, the audio search prompt may be "What is your favorite animal?" If the user provides a voice response to such a prompt (e.g., identifying a specific animal), a search can be performed based on the response, and the resulting content items (e.g., videos related to the specific animal) can be presented to the user. In some implementations, once the user selects the bubble and provides a voice response to the audio search prompt, no other user input is needed to initiate the search.

According to some aspects of the present disclosure, if a bubble is not selected within a threshold amount of time, the GUI may display a bubble popping automatically, resulting in an audio prompt being played to the user. For example, one of the bubbles can randomly pop after a 10-15 second interval, and the user can hear a hint question (audio search prompt) suggesting a topic for a search.

Audio search prompts played for the user (when selected or popped automatically) can be continuously changed to suggest new topics for content searches, thereby teaching young users about various things for which they can search through this game-like experience. In addition, in some implementations, audio search prompts can be customized for a specific user. For example, an audio search prompt to be played can be selected for a user based on the age, location or search history of the user, the current date/time, the user's demographics, the prior history of prompts already posed to the user, etc. For example, users within a certain age range may be asked questions from a prompt list specific to that age range. Users may be asked specific seasonal questions around the holidays or during other calendar timing events. Users may be asked school related questions during the school year, and "fun" questions during the summer. A prompt selection may be constantly refined for a user as search histories are updated to provide insight into the user's content preference.

Accordingly, aspects of the present disclosure provide a gamified voice search experience to assist young users with performing searches specifically tailored to the young users. As a result, children can search for and be presented with age-appropriate content selected from a very large number of content items (e.g., billions of videos).

The present disclosure often references videos for simplicity and brevity. However, the teaching of the present disclosure are applied to media items generally and can be applied to various types of content or media items, including for example, video, audio, text, images, program instructions, etc. The media items referred to herein represent viewable and/or shareable media items.

FIG. 1 illustrates an example system architecture 100, in accordance with one implementation of the disclosure. The system architecture 100 includes a user device 110, a network 105, a data store 106, a content sharing platform 120, and a server 130. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

User devices 110 may include computing devices such as personal computers (PCs), laptops, mobile phones, smart phones, tablet computers, network connected televisions, netbook computers etc. The user device 110 may include a media viewer 112. In one implementation, the media viewer 112 may be an application that allows a user to view content, such as images, videos, web pages, documents, etc. For example, the media viewer 112 may be a web browser that can access, retrieve, present, and/or navigate content (e.g., web pages such as Hyper Text Markup Language (HTML) pages, digital media items, etc.) served by a web server. The media viewer 112 may render, display, and/or present the content (e.g., a web page, a media viewer) to a user. The media viewer 112 may also display an embedded media player (e.g., a Flash® player or an HTML5 player) that is embedded in a web page (e.g., a web page that may provide information about a product sold by an online merchant). In another example, the media viewer 112 may be a standalone application (a mobile application or "app") that allows users to search for digital media items (e.g., digital videos, digital images, electronic books, etc.) and can present a media player to play video and audio media items for the user. According to aspects of the present disclosure, the media viewer 112 may be a children-specific application that allows users to view and search for content appropriate for children.

The media viewer 112 may be provided to the user device 110 by the server 130 and/or content sharing platform 120. The media viewer 112 may include a search interface 111 that allows a user to search for content hosted by content sharing platform 120. The search interface 111 may include a voice search indicator that can be selected to initiate a voice search option. The search interface 11 may also include other GUI elements that allow a user to interact with the gamified voice search features described herein. For example, search interface 111 may receive a user request to perform a voice search (a search associated with an audio input). A user may activate a voice search indicator (e.g., by clicking on it) in search interface 111 and provide audio input to initiate a voice search. If the audio input is received from the user, the audio input may be sent to content sharing platform 120 and/or server 130 to undergo voice recognition operations to define a search query. Alternatively, voice recognition can be performed on the user device 110, and the resulting search query can be sent to content sharing platform 120 and/or server 130.

If the audio input is not received within a certain time interval from the activation of the voice search indicator in the search interface 111, one or more GUI elements representing one or more audible search prompts (e.g., one or more bubbles with question marks inside) may be displayed by the search interface 111. The above time interval may be a default time interval. In one implementation, a user is allowed to modify the default setting of the time interval.

A GUI element (e.g., a bubble with a question mark) representing an audio search prompt may be activated to cause the audio prompt to be played to a user, thereby aiding the user in searching for content of interest. A GUI element representing an audio search prompt may be activated upon a user selection of the GUI element or upon an expiration of a specific time period from the appearance of the GUI element on the screen, which can result in a visual indication of such a self-activation (e.g., by displaying an automated popping of the corresponding bubble). Example audio search prompts can include, but are not limited to:

What is your favorite animal?
What is your favorite video game?
What is your favorite sport?
What would you like to search for?

The audio search prompts being played can be specific to the user. Some aspects of the determination and selection of customized audio search prompts for the user are discussed in more detail below.

In one implementation, when the user provides an audio response to the audio search prompt, this audio response defining a search query is provided (e.g., as audio data or text data resulting from voice recognition) to content sharing platform 120 and/or server 130 to perform a search. For example, after the audio search prompt, "What is your favorite animal?" is played to the user, the user may respond, "Giraffe!" In this case, the audio response "Giraffe" may be provided as the search query. The content sharing platform 120 and/or server 130 may then perform a search for media items relating to Giraffes, which can then be returned to the user device 110 and presented to the user by the media viewer 112.

In one implementation, the content sharing platform 120 may be one or more computing devices (such as a rackmount server, a router computer, a server computer, a personal computer, a mainframe computer, a laptop computer, a tablet computer, a network connected television, a desktop computer, etc.), data stores (e.g., hard disks, memories, databases), networks, software components, and/or hardware components that may be used to provide a user with access to media items and/or provide the media items to the user. For example, the content sharing platform 120 may allow a user to consume, upload, search for, approve of ("like"), dislike, and/or comment on media items. The content sharing platform 120 may also include a website (e.g., a webpage) that may be used to provide a user with access to the media items.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user". In another example, an automated consumer may be an automated ingestion pipeline, such as a topic channel, of the content sharing platform 120.

The content sharing platform 120 may include media items 121. Examples of a media item 121 can include, and are not limited to, digital video, digital movies, digital photos, digital music, website content, social media updates, electronic books (e-books), electronic magazines, digital newspapers, digital audio books, electronic journals, web blogs, real simple syndication (RSS) feeds, electronic comic books, software applications, etc. In some implementations, media item 121 is also referred to as a content item.

A media item 121 may be consumed via the Internet and/or via a mobile device application. For brevity and simplicity, an online video (also hereinafter referred to as a video) is used as an example of a media item 121 throughout this document. As used herein, "media," "media item," "online media item," "digital media," "digital media item," "content," and "content item" can include an electronic file that can be executed or loaded using software, firmware or hardware configured to present the digital media item to an entity. In one implementation, the content sharing platform 120 may store the media items 121 using the data store 106. The content sharing platform 120 may also store playlists created by users, third parties or automatically. A playlist may include a list of content items (e.g., videos) that can be played (e.g., streamed) in sequential or shuffled order on the content sharing platform.

In one implementation, the server 130 may be one or more computing devices (e.g., a rackmount server, a server computer, etc.). The server 130 may be included in the content sharing platform 120 or be part of a different system. The server 130 may host a voice search system 140. The voice search system 140 enables the identification of audio search prompts to help identify, curate, and present content appropriate for children, in implementations of the disclosure. Content appropriate for children may refer to one or more content items that are safe (e.g., not mature, violent or explicit) and/or relevant (e.g., entertaining or interesting) for children.

The voice search system 140 may include several components (e.g., modules, sub-modules, applications, etc.) that can be executed by one or more processors of a machine hosting the voice search system 140. These components may include, for example, a search prompt unit 160, an age unit 162, a location unit 164, a time unit 165, and a search history unit 166. More or less components can be included in the voice search system 140 to provide functionality described herein.

In one implementation, search prompt unit 160 determines which audio search prompts to send to user device 110 for a gamified voice search. Audio search prompts may be sent to user device as audio data or text data that can be converted to audio search prompts at the user device 110. Prompts may be specifically determined on a per-user or per-device basis. Advantageously, customized prompts for users may allow for better retention of those users within the content sharing platform and a better game-like voice search experience for the user. Search prompt unit 160 may utilize age unit 162 to determine appropriate prompts to provide to a user, based on the user's age. Likewise, location unit 164 may aid in determining appropriate prompts based on a user's location (or a location of the user device), and time unit 165 may help in determining appropriate prompts based on a calendar time of the search. For example, if a search is performed during the school year, scholastic prompts may be determined to be more appropriate than leisurely prompts. Or, if the search is performed around the holidays, holiday-themed prompts may be determined to be appropriate. In one implementation, search history unit 168 may aid in the procurement of prompts based on the search history of a user (or the search history associated with the user device 110). For example, based on a user's search history, it may be determined that the user enjoys content about a particular video game. Search history unit 166 may identify other prompts related to the same video game to provide to the user. The prompts may be compiled and stored in a database (e.g., a databased of data store 106), with rankings that represent the relevancy or appropriateness to a user. In one implementation, the prompts may be stored on user device 110.

It should be noted that functions described in one implementation as being performed by the content sharing platform 120 can also be performed on the user device 110 in other implementations, if appropriate. In addition, the functionality attributed to a particular component can be performed by different or multiple components operating together. The content sharing platform 120 can also be accessed as a service provided to other systems or devices through appropriate application programming interfaces, and thus is not limited to use in websites.

Although implementations of the disclosure are discussed in terms of content sharing platforms and promoting social network sharing of a content item on the content sharing platform, implementations may also be generally applied to any type of social network providing connections between users.

In situations in which the systems discussed here collect personal information about users, or may make use of personal information, the users may be provided with an opportunity to control whether the content sharing platform 120 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 120.

Figure 2:
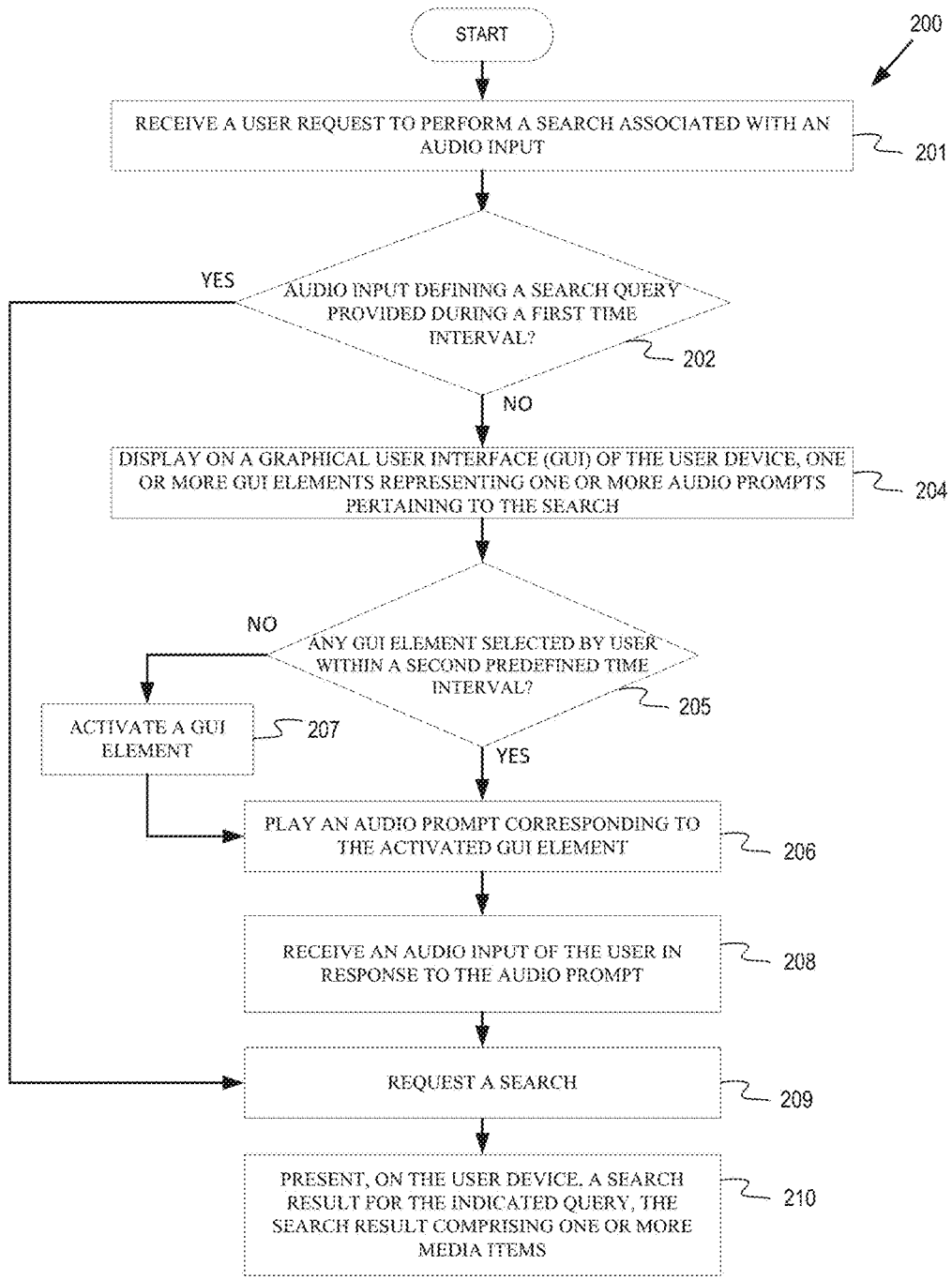
FIG. 2 is a flow diagram illustrating a method for gamifying voice search, according to an implementation.

FIG. 2 is a flow diagram illustrating a method for gamifying voice search, according to an implementation. The method 200 may be performed by processing logic that comprises hardware (e.g., circuitry, dedicated logic, programmable logic, microcode, etc.), software (e.g., instructions run on a processing device to perform hardware simulation), or a combination thereof. In one embodiment, media viewer 112 on user device 110 performs method 200.

Referring to FIG. 2, at block 201, processing logic receives a user request to perform a search associated with an audio input. The user request may be a result of the user clicking on a GUI element (also referred to as a voice search indicator) in search interface 111 on the user device 110 that represents a voice search. In one embodiment, such a voice search GUI element may be visually represented as a microphone, a person speaking, a question mark, or any other graphical representation of a voice search. From the time that the user activates the voice search GUI element, the user device may be actively listening for an audio input provided by the user for the voice search. At block 202, processing logic determines whether the audio input defining a search query has been provided during a first time interval. The first time interval may be predefined or customizable by a user. If the audio input defining the search query is received within the first time interval, processing logic may request a search (e.g., by sending the search query to a server tasked with performing the search) based on the search query at block 209, and receive the results of the search from the server. At block 210, processing logic presents the search results including one or more media items on the user device 110.

Otherwise, if a search query was not received within the predefined time interval as determined at block 202, processing logic displays, in the search interface 111 on the user device 110, one or more GUI elements representing one or more audio voice prompts pertaining to the voice search at block 204. For example, processing logic may display GUI elements in the form of bubbles, floating around the screen of the user device 110. Each bubble may represent a single audio prompt that corresponds to a voice search. For example, one of the bubbles may correspond to the prompt "What is your favorite animal?", and another bubble may represent the prompt "What is your favorite sport?" In another implementation, the individual GUI elements do not represent predefined audio search prompts, but are merely placeholders for audio search prompts. In this way, audio search prompts may be provided in a particular order regardless of which GUI element the user activates first.

At block 205, processing logic determines whether one of the GUI elements is selected by the user before a second predefined time interval has expired from the appearance of the GUI elements in the search interface 111. It should be noted that once the user request to perform the voice search is received from the user at block 201, processing logic may continue actively listening for audio input of the user for a third time interval. The third time interval may be predefined and/or customizable by a user. By listening for audio input of the user even after the first predefined time interval expires and the GUI elements representing prompts are displayed, processing logic allows the user to provide such an audio input at any time, without any further manual interaction (e.g., via a touch input or keyboard input) with the search interface 111 on the user device.

If a GUI element is selected by the user before the second threshold of time expires, processing logic plays an audio search prompt corresponding to the activated GUI element at block 206. As discussed above, audio search prompts may be specific to a user. Thus, the user has a unique and customized gamified voice search experience tailored specifically to assist the user in performing voice search.

If none of the GUI elements displayed at block 204 is selected within the second predefined time interval, processing logic automatically (without any user interaction) activates a GUI element at block 207, such as by visually illustrating an automated popping of a corresponding bubble. In one implementation, processing logic may determine which GUI element should be automatically activated in a random (non-deterministic) manner. In another implementation, processing logic may determine which GUI element should be automatically activated based on rankings of associated audio search prompts. For example, if five GUI elements are displayed, representing five audio search prompts, processing logic may activate the GUI element corresponding to the audio search prompt associated with a topic that is most likely to be of interest to the user. Audio search prompts may be ranked according to any number of attributes, including, but not limited to, predicted interest to the user, frequency of appearance (i.e. how many times this audio search prompt has been provided to the user before), etc.

Once a GUI element is automatically activated at block 207, method 200 continues to block 206 where the audio voice prompt corresponding to the activated GUI element is played, as discussed above.

At block 208, processing logic receives audio input of the user in response to the audio voice prompt. The audio input provided by the user defines a query for the search. In one implementation, the audio input is a direct response to the question posed by the audio search prompt. For example, audio input of "Giraffe!" may be received as an answer to the audio search prompt "What is your favorite animal?" In another embodiment, the audio input may not be a logical answer to the question posed by the audio search prompt. For example, in response to the prompt, "What is your favorite animal?" the audio input may be "Baseball!" In such a case, the audio input "Baseball!" may still be used to define the query for the search, even though it does not directly answer the provided prompt. At block 209, processing logic may request a search (e.g., by sending the search query to a server tasked with performing the search) based on the search query at block 208 and receive the results of the search from the server. At block 210, processing logic presents the search results including one or more media items. The media items may be presented by media viewer 112 on the user device 110.

Figure 3:
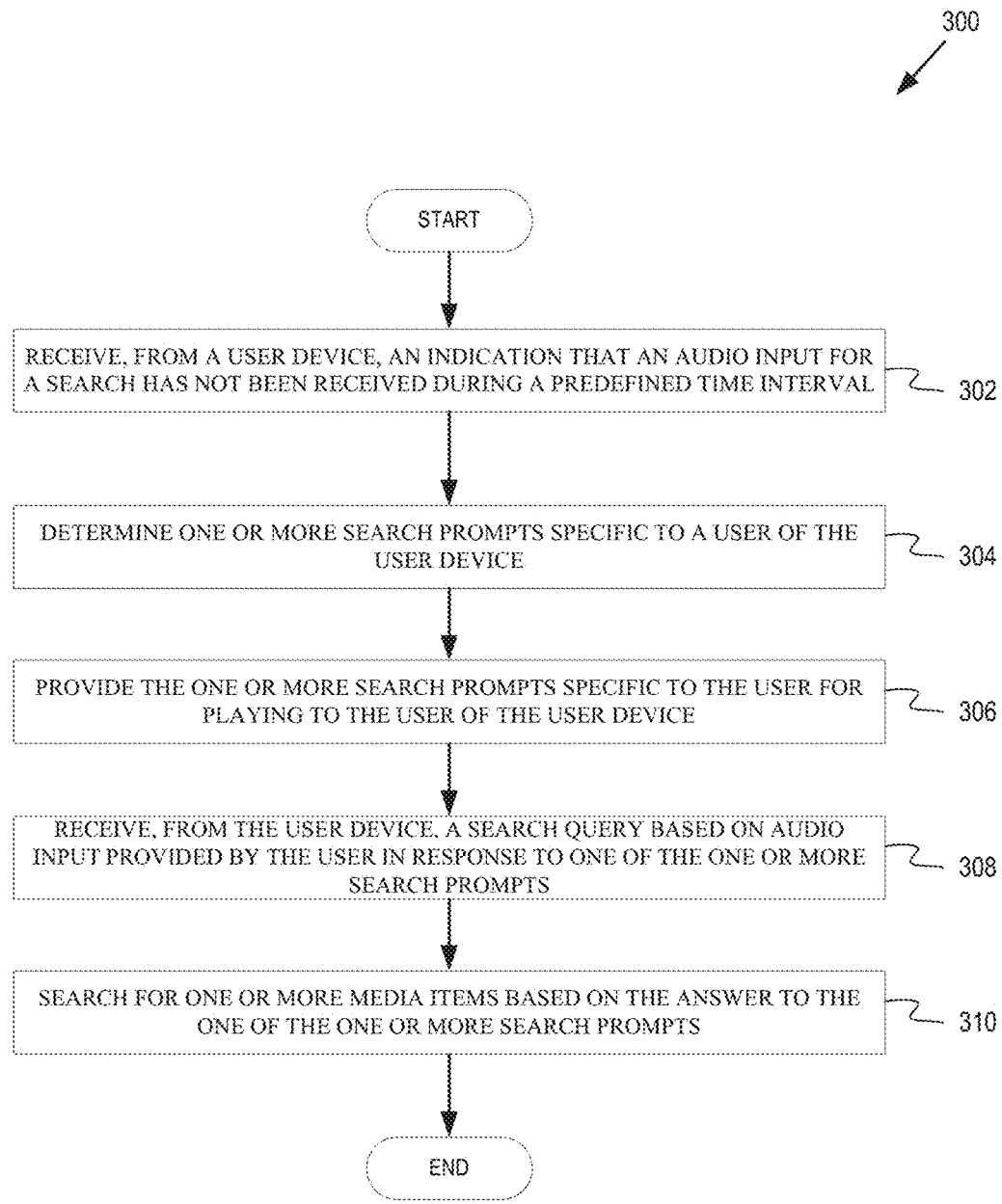
FIG. 3 is a flow diagram illustrating a method for identifying search prompts for a gamified voice search, according to some implementations.

FIG. 3 is a flow diagram illustrating a method for identifying search prompts for a gamified voice search, according to some implementations. The method 300 may be performed by processing logic that comprises hardware (e.g., circuitry, dedicated logic, programmable logic, microcode, etc.), software (e.g., instructions run on a processing device to perform hardware simulation), or a combination thereof. In one embodiment, voice search system 140 of FIG. 1 performs method 300.

Referring to FIG. 3, at block 302, processing logic receives, from a user device (e.g., user device 110 of FIG. 1), an indication that an audio input for a voice search has not been received during a predefined time interval. At block 304, processing logic determines one or more search prompts specific to a user of the user device. Determining search prompts may involve determining rankings of stored search prompts based on one or more characteristics including, for example, an age of the user, location of the user (or user device), seasonal timing of the search, the search history of the user, etc. Characteristics like those listed above may be combined (e.g., in a machine learning algorithm) to determine an ordered list of prompts specifically tailored to a particular user. The ranking of prompts may change as the underlying characteristics change. Furthermore, new prompts may be continually determined based on updated user characteristics.

At block 306, processing logic may provide the one or more search prompts specific to the user for playing to the user of the user device. In one implementation, prompts are provided one at a time, or several at a time, to be played on-demand on the user device. In other implementations, prompts may be provided for storage on the user device.

At block 308, processing logic receives, from the user device, a search query based on audio input provided by the user in response to one of the search prompts, and at block 310, processing logic searches for one or more media items based on the search query, and returns the search result to the user device.

Figure 4:
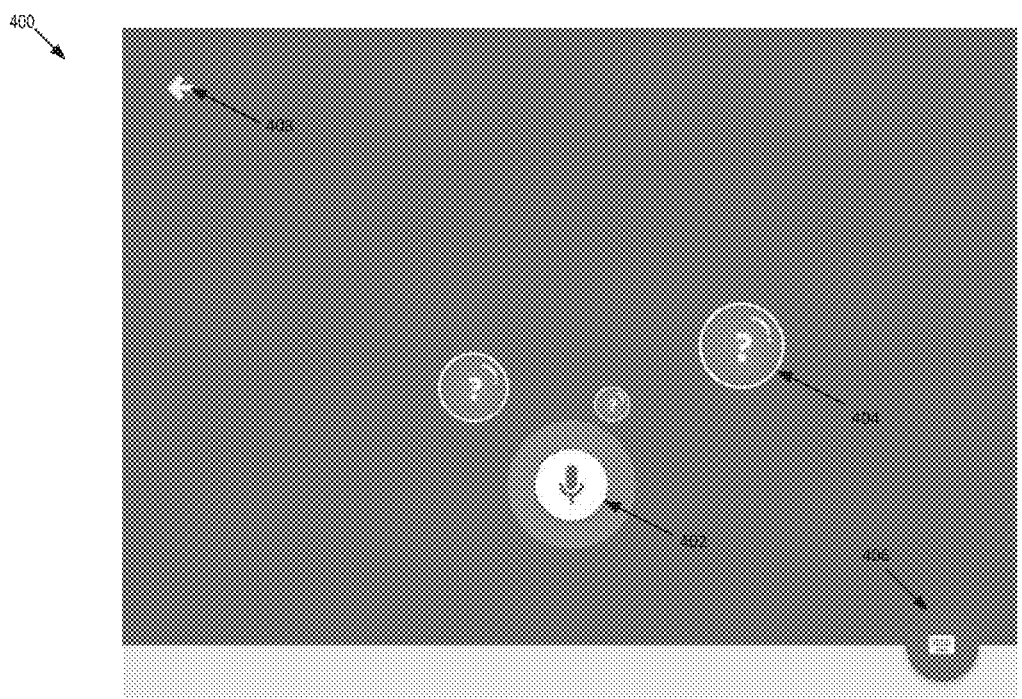
FIG. 4 illustrates an example gamified voice search user interface corresponding to a voice search activation stage, according to an implementation.

FIG. 4 illustrates an example gamified voice search user interface 400 corresponding to a voice search activation stage, according to an implementation. The gamified voice search interface 400 may be presented on a user device and may include a GUI element 402 that represents a voice search initiation. If activated by a user, voice search GUI element 402 may initiate a voice search option. In some implementations, GUI element 402 may depict a microphone, a person speaking, or other graphical representation of a voice search. Once activated, GUI element 402 may be transformed in some way (e.g., it may be animated by pulsing, bouncing, changing colors etc.) to indicate that a microphone is currently activated and that listening for a voice search query has started.

The gamified voice search interface 400 may also include one or more GUI elements 404 that represent audio search prompts. GUI elements 404 may depict a question mark (as shown) or some other graphical representation of a search prompt. In one implementation, GUI elements 404 are animated, floating around on the screen of the user device. GUI elements 404 may collide with and bounce off of each other and off of other GUI elements (e.g., GUI element 402). The gamified voice search interface 400 may also include a GUI element 406 that when activated, allows a user to enter a textual search mode. A user may also activate a GUI element 408 to go back to a previous screen of the application providing the gamified voice search interface 400.

Figure 5:
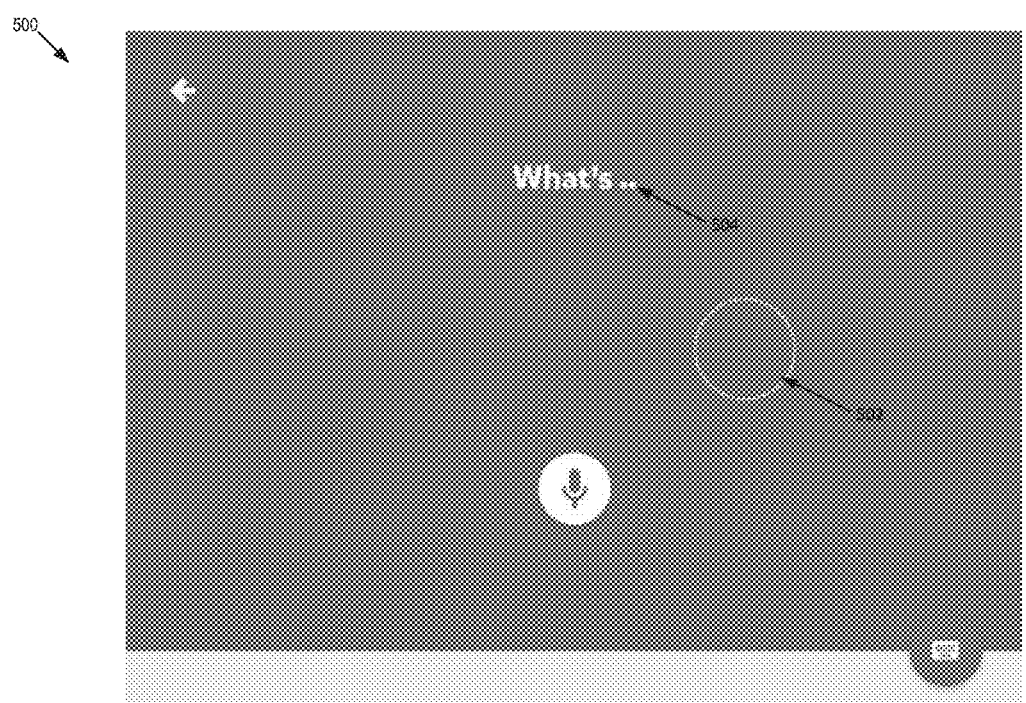
FIG. 5 illustrates an example gamified voice search user interface corresponding to a search prompt activation stage, according to implementations of the disclosure.

FIG. 5 illustrates an example gamified voice search user interface 500 corresponding to a search prompt activation stage, according to implementations of the disclosure. The gamified voice search interface 500 includes a representation 502 of an activated GUI element 404 of FIG. 4 that is animated in response to the activation (caused by user selection or automated activation as described above). For example, GUI elements 404 may "pop" and/or display "waves" extending outward, 502. Interface 500 may also display a search prompt 504 in textual form. The search prompt 504 may also be played as an audio prompt (e.g., for young users who cannot read or otherwise understand the textual prompt). The search prompt 504 may be displayed in textual form at substantially the same time as the audio prompt is playing.

Figure 6:
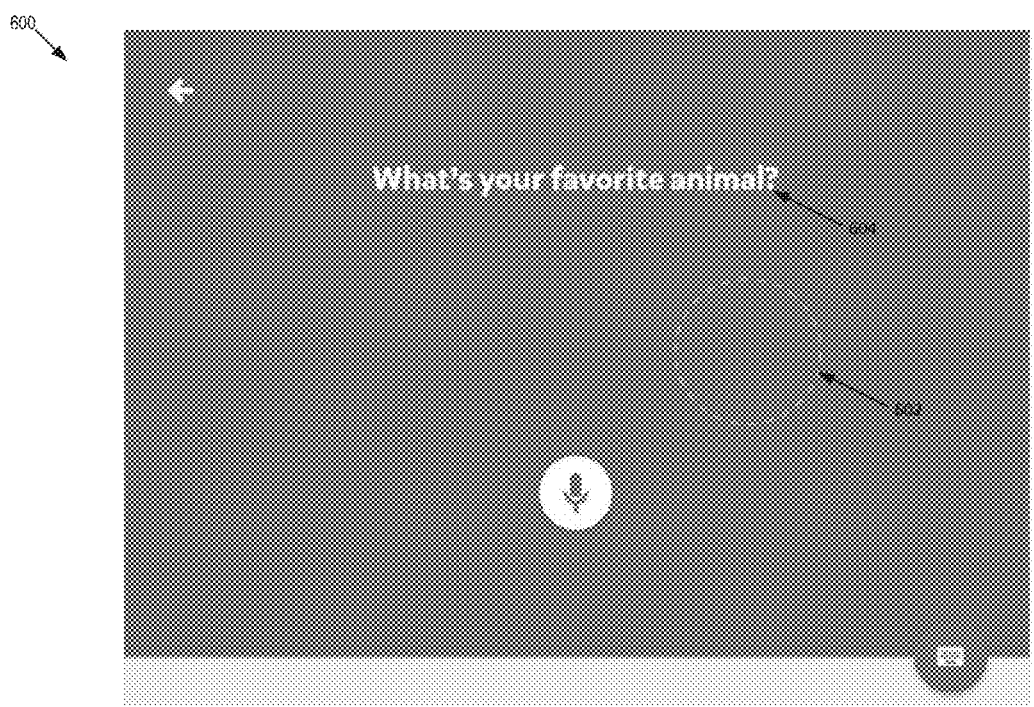
FIG. 6 illustrates another example gamified voice search user interface corresponding to a search prompt activation stage, according to implementations of the disclosure.

FIG. 6 illustrates another example gamified voice search user interface 600 corresponding to a search prompt activation stage, according to implementations of the disclosure. As seen in the gamified voice search interface 600, an activated GUI element of FIG. 4 and FIG. 5 is continuing its animation by expanding outwards to indicate that it was activated. The gamified voice search interface 600 displays full text of search prompt 604. In one implementation, the audio prompt associated with the textual search prompt 604 completes its play when the textual search prompt 604 finishes its progressive, animated display.

Figure 7:
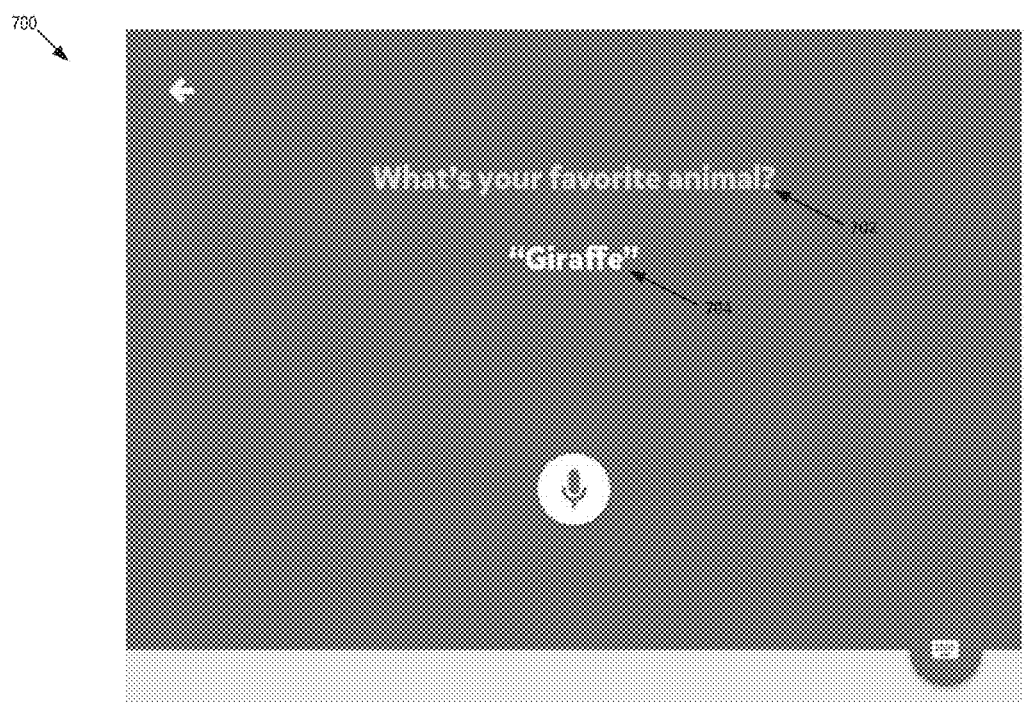
FIG. 7 illustrates an example gamified voice search user interface corresponding to a search query definition stage, according to implementations of the disclosure.

FIG. 7 illustrates an example gamified voice search user interface 700 corresponding to a search query definition stage, according to implementations of the disclosure. The gamified voice search interface 700 demonstrates a search prompt 702, which can visually indicate that a response to the search prompt 702 has been received. In one implementation, the search prompt 702 is displayed in a faded color or a different color when a response is received. The response may be received as audio input, and may be shown in textual form 704 on the gamified search interface 700 (e.g., at substantially the same time as a user is providing the audio response).

Figure 8:
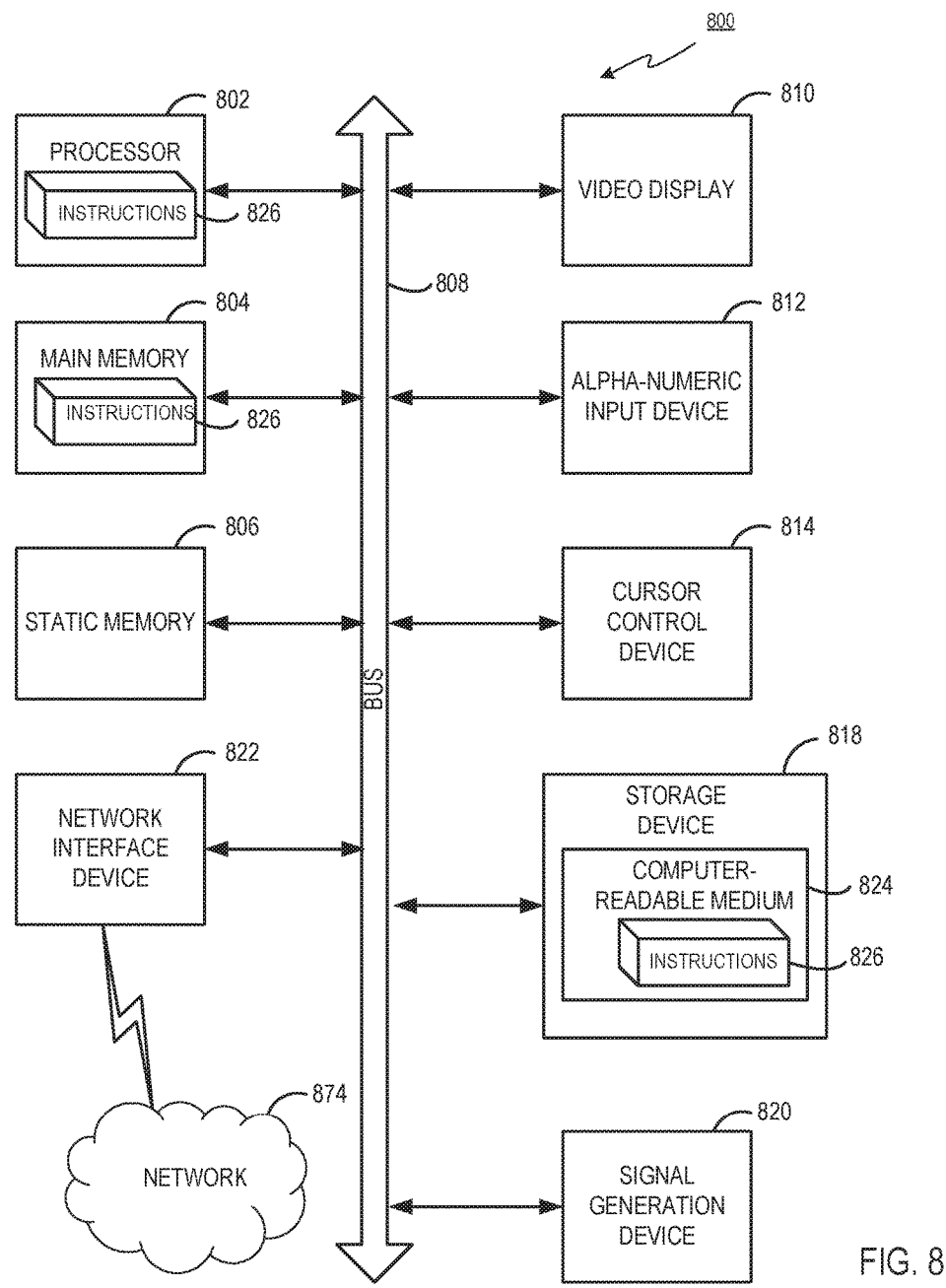
FIG. 8 is a block diagram illustrating one implementation of a computer system, according to an implementation.

FIG. 8 illustrates a diagrammatic representation of a machine in the exemplary form of a computer system 800 within which a set of instructions, for causing the machine to perform any one or more of the methodologies discussed herein, may be executed. In alternative implementations, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a network connected television, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one implementation, computer system 800 may be representative of a server, such as server 102, executing a voice search system 140, as described with respect to FIGS. 1-7.

The exemplary computer system 800 includes a processing device 802, a main memory 804 (e.g., read-only memory (ROM), flash memory, dynamic random access memory (DRAM) (such as synchronous DRAM (SDRAM) or Rambus DRAM (RDRAM), etc.), a static memory 806 (e.g., flash memory, static random access memory (SRAM), etc.), and a data storage device 818, which communicate with each other via a bus 808. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 802 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute processing logic 826 for performing the operations and steps discussed herein.

The computer system 800 may further include a network interface device 822. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker).

The data storage device 818 may include a computer-readable storage medium 824 (also referred to as a machine-readable storage medium), on which is stored one or more set of instructions 826 (e.g., software) embodying any one or more of the methodologies of functions described herein. The instructions 826 may also reside, completely or at least partially, within the main memory 804 and/or within the processing device 802 during execution thereof by the computer system 800; the main memory 804 and the processing device 802 also constituting machine-readable storage media. The instructions 826 may further be transmitted or received over a network 874 via the network interface device 822.

The computer-readable storage medium 824 may also be used to store instructions to perform a method for identifying content appropriate for children algorithmically without human interaction, as described herein. While the computer-readable storage medium 824 is shown in an exemplary implementation to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or."

Although the operations of the methods herein are shown and described in a particular order, the order of the operations of each method may be altered so that certain operations may be performed in an inverse order or so that certain operation may be performed, at least in part, concurrently with other operations. In another implementation, instructions or sub-operations of distinct operations may be in an intermittent and/or alternating manner.

What is claimed is:

1. A method comprising:
receiving, by a processing device, a request to initiate a search associated with an audio input;
determining that the audio input associated with the search is absent during a first predefined time interval;
providing for display a plurality of graphical user interface elements that represent a plurality of audio prompts pertaining to the search;
in response to determining that there is no user selection of the graphical user interface elements during a second predefined time interval, activating one of the graphical user interface elements based on a ranking of the plurality of audio prompts;
playing an audio prompt of the activated graphical user interface element, wherein the audio prompt comprises a question and is played prior to receiving audio input associated with the search;
receiving, by the processing device, the audio input in response to the audio prompt, the audio input providing data for the search; and
providing for presentation, by the processing device, a search result for the search, wherein the search result comprises one or more media items.

2. The method of claim 1 further comprising:
in response to the activation, displaying a visual prompt corresponding to the activated graphical user interface element, in addition to the playing of the audio prompt.

3. The method of claim 1 wherein the plurality of audio prompts are based on an age of a user.

4. The method of claim 1 wherein the plurality of audio prompts are based on a location of a user device.

5. The method of claim 1 wherein the plurality of audio prompts are based on a search history of a user.

6. The method of claim 1 wherein the plurality of audio prompts are based on a calendar time of the search.

7. The method of claim 1 wherein the graphical user interface elements comprise a second graphical user interface element that is activated when a user selects the second graphical user interface element.

8. The method of claim 1, wherein the activated graphical user interface element is automatically activated in response to detecting an absence of user input during the second predefined time interval.

9. The method of claim 1 further comprising:
after playing the audio prompt, allowing the user to provide the audio input within a third time interval without any manual interaction with a graphical user interface.

10. The method of claim 1 further comprising determining one or more audio prompts that are specific to a user, wherein determining the one or more audio prompts comprises:
receiving an age of the user; and
determining the one or more audio prompts based on the age.

11. The method of claim 1 further comprising determining one or more audio prompts that are specific to a user, wherein determining the one or more audio prompts comprises:
determining at least one of: a location of a device of the user, a search history of the user, or a calendar time of the search; and
determining the one or more audio prompts based on the location, the search history, or the calendar time of the search.

12. The method of claim 1 wherein each media item of the one or more media items has a rating that indicates appropriateness of a respective media item for children.

13. A system comprising:
a memory; and
a processing device coupled to the memory, wherein the processing device is to:
receive a request to initiate a search associated with an audio input;
determine that the audio input associated with the search is absent during a first predefined time interval;
provide for display a plurality of graphical user interface elements that represent a plurality of audio prompts pertaining to the search;
responsive to determining that there is no user selection of the graphical user interface elements during a second predefined time interval, activate one of the graphical user interface elements based on a ranking of the plurality of audio prompts;
playing an audio prompt of the activated graphical user interface element, wherein the audio prompt comprises a question and is played prior to receiving audio input associate with the search;
receiving the audio input in response to the audio prompt, the audio input providing data for the search; and
providing for presentation a search result for the search, wherein the search result comprises one or more media items.

14. The system of claim 13, wherein the plurality of audio prompts are based on an age of a user of a user device comprising the processing device.

15. The system of claim 13, wherein the plurality of audio prompts are based on a location of a user device.

16. The system of claim 13, wherein the plurality of audio prompts are based on a search history of a user.

17. The system of claim 13, wherein the plurality of audio prompts are based on a calendar time of the search.

18. The system of claim 13, wherein the graphical user interface elements comprise a second graphical user interface element that is activated when a user clicks on the second graphical user interface element.

19. A non-transitory machine-readable storage medium storing instructions which, when executed, cause a processing device to:
receive a request to initiate a search associated with an audio input;
determine that the audio input associated with the search is absent during a first predefined time interval;
providing for display a plurality of graphical user interface elements that represent a plurality of audio prompts pertaining to the search;
in response to determining that there is no user selection of the graphical user interface elements during a second predefined time interval, activating one of the graphical user interface elements based on a ranking of the plurality of audio prompts;

playing an audio prompt of the activated graphical user interface element, wherein the audio prompt comprises a question and is played prior to receiving audio input associated with the search;

receiving the audio input in response to the audio prompt, the audio input providing data for the search; and providing for presentation, on the user device, a search result for the search, wherein the search result comprises one or more media items.

20. The non-transitory machine-readable storage medium of claim 19, further comprising: in response to the activation, displaying a visual prompt corresponding to the activated graphical user interface element, in addition to the playing of the audio prompt.

21. The non-transitory machine-readable storage medium of claim 19, further comprising: activating the graphical user interface element responsive to detecting an absence of user input during the second predefined time interval.

22. The non-transitory machine-readable storage medium of claim 19, further comprising: after playing the audio prompt, receiving the audio input within a third time interval without any manual interaction with a graphical user interface.

23. The non-transitory machine-readable storage medium of claim 19, wherein each media item of the one or more media items is associated with a rating that indicates appropriateness for children.

* * * * *